US010157198B2

(12) United States Patent
Cheng et al.

(10) Patent No.: US 10,157,198 B2
(45) Date of Patent: Dec. 18, 2018

(54) DATA CREDIBILITY VOUCHING SYSTEM

(71) Applicant: International Business Machines Corporation, Armonk, NY (US)

(72) Inventors: Theodora H. Cheng, Grand Prairie, TX (US); Tsz S. Cheng, Grand Prairie, TX (US); Tejashkumar B. Purani, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 14/552,840

(22) Filed: Nov. 25, 2014

(65) Prior Publication Data

US 2016/0147817 A1    May 26, 2016

(51) Int. Cl.
G06F 15/16   (2006.01)
G06F 17/30   (2006.01)
G06Q 10/10   (2012.01)

(52) U.S. Cl.
CPC ....... *G06F 17/30371* (2013.01); *G06Q 10/10* (2013.01)

(58) Field of Classification Search
CPC ................ G06Q 30/0282; H04L 29/08072
USPC .................... 705/347; 709/203, 217, 219
See application file for complete search history.

(56) References Cited

U.S. PATENT DOCUMENTS

| 8,494,973 B1 | 7/2013 | Dignan et al. |
| 2011/0282823 A1 | 11/2011 | Yahia et al. |
| 2013/0159127 A1 | 6/2013 | Myslinski |
| 2013/0304573 A1 | 11/2013 | Pinhas |
| 2013/0332385 A1* | 12/2013 | Kilroy ............ G06Q 30/02 705/347 |
| 2014/0122369 A1 | 5/2014 | Chow |
| 2014/0149234 A1 | 5/2014 | Neubardt |
| 2014/0258169 A1* | 9/2014 | Wong ............. G06Q 30/0282 705/347 |

(Continued)

FOREIGN PATENT DOCUMENTS

JP    2003167971 A    6/2003

OTHER PUBLICATIONS

Yang et al., "Detecting Frauds in Restaurant Reviews," 2013, pp. 123-129.

*Primary Examiner* — Andy Ho
(74) *Attorney, Agent, or Firm* — Daniel Simek; Hoffman Warnick LLC (57) ABSTRACT

A system, method and program product are provided for implementing a credibility vouching system (CVS). A CVS is disclosed that includes: credibility vouching system (CVS), comprising: a data aggregation system interface that provides a communication pathway for receiving event metadata (EM) records from a data aggregation system; a service provider interface and inquiry system that provides a communication pathway with a plurality of third party service providers to facilitate identification of a set of candidate nodes potentially responsible for a submitted EM record in the data aggregation system; a vouching request routing system for generating a vouching request and tasking at least one third party service provider to forward the vouching request to the set of candidate nodes; and a credibility scoring system that generates a credibility score for the submitted EM record based on a set of vouching responses received from the set of candidate nodes.

20 Claims, 4 Drawing Sheets

(56) References Cited

U.S. PATENT DOCUMENTS

2014/0304814 A1* 10/2014 Ott .................. G06F 17/274
 726/22
2016/0070709 A1* 3/2016 Luan ................ G06Q 30/0282
 707/728

* cited by examiner

DATA CREDIBILITY VOUCHING SYSTEM

TECHNICAL FIELD

The subject matter of this invention relates to evaluating and enhancing the credibility of data inputted into a data aggregation system.

BACKGROUND

There exist numerous data aggregation systems in which event-based data is captured from random sources and processes, and made available for use by third party data consumption processes. For example, event-based data may comprise automated or manually generated feedback or metadata associated with some event. An event may for example include any interaction between two or more nodes in some pre-defined space.

In many data aggregation systems, such inputted data is obtained from unknown or unqualified sources. Accordingly, the reliability and credibility of the event-based data being made available cannot be guaranteed. While some suspect data may be identified and/or filtered out by various mechanisms, it is impossible to identify and filter all such instances.

One further approach to enhancing the reliability of such event-based data is to identify and vet sources that are providing information to the data aggregation system. Unfortunately, because of the unpredictable nature of event-based data, i.e., who, what, when and how it is created, it is extremely difficult to identify such sources.

SUMMARY

The present invention provides a system and method for evaluating and enhancing the credibility of event-based data inputted into a data aggregation system.

A first aspect provides a credibility vouching system (CVS), comprising: a data aggregation system interface that provides a communication pathway for receiving event metadata (EM) records from a data aggregation system; a service provider interface and inquiry system that provides a communication pathway with a plurality of third party service providers to facilitate identification of a set of candidate nodes potentially responsible for a submitted EM record in the data aggregation system; a vouching request routing system for generating a vouching request and tasking at least one third party service provider to forward the vouching request to the set of candidate nodes; and a credibility scoring system that generates a credibility score for the submitted EM record based on a set of vouching responses received from the set of candidate nodes.

A second aspect provides a computerized method for vouching credibility of event metadata (EM) records inputted to a data aggregation system, comprising: receiving an EM record from the data aggregation system; communicating with a plurality of third party service providers to facilitate identification of a set of candidate nodes potentially responsible for the EM record; generating a vouching request and tasking at least one third party service provider to forward the vouching request to the set of candidate nodes; and generating a credibility score for the submitted EM record based on a set of vouching responses received from the set of candidate nodes.

A third aspect of the invention provides a program product stored on a computer readable storage medium, which when executed by a computer system, provides a credibility score for event metadata submitted to data aggregation system, comprising: program code for receiving an EM record from the data aggregation system; program code for communicating with a plurality of third party service providers to facilitate identification of a set of candidate nodes potentially responsible for the EM record; generating a vouching request and tasking at least one third party service provider to forward the vouching request to the set of candidate nodes; and generating a credibility score for the submitted EM record based on a set of vouching responses received from the set of candidate nodes.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
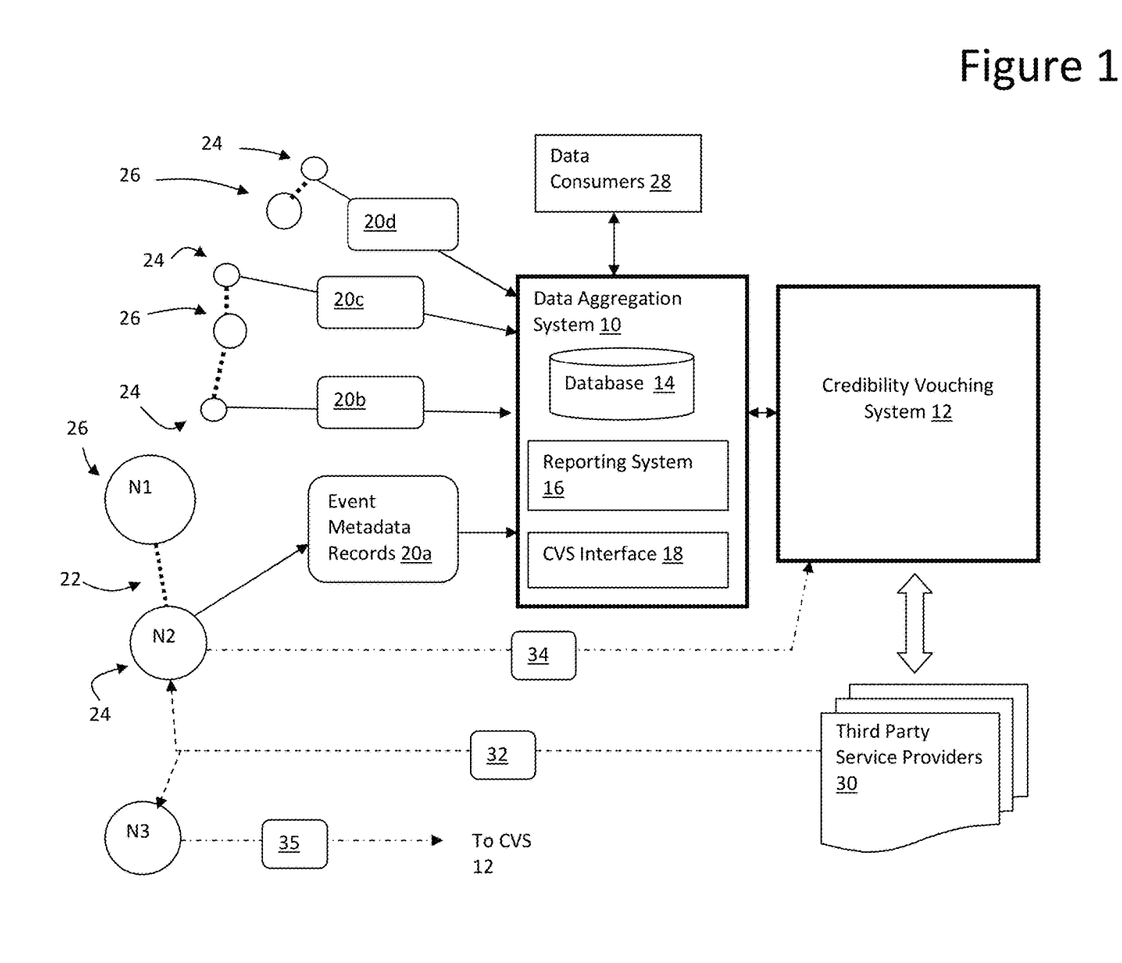
FIG. 1 shows a framework for implementing a credibility vouching system (CVS) according to embodiments.

FIG. 1 depicts a generalized framework for implementing a credibility vouching system (CVS) 12 that is utilized in conjunction with one or more data aggregation systems 10. In this example, data aggregation system 10 receives event metadata records 20a, 20b, 20c, 20d (collectively, "EM records 20") from participating reporting nodes 24. Data aggregation system 10 aggregates and stores the EM records 20 in a database 14 and provides a reporting system 16 that allows data consumers 28 to use the aggregated data.

EM records 20 generally comprise information relating to an event or interaction 22 that occurred between a reporting node 24 and a resource node 26. Resource nodes 26 represent any type of resource or service that are made available within a relevant event space. In this example, it can be seen that reporting node N2 had an interaction 22 with resource node N1, which resulted in an EM record 20a being reported to data aggregation system 10. EM record 20a may include any information about the interaction 22, e.g., time, location, success/failure, cost, feedback, review, name, commentary, log files, etc. The EM records 20 may for example be stored in an extensible markup language XML file, e.g.,

```
<EM Record> = 101
    <Data Aggregation System> = DAS.123
    <Resource Node ID> = node xyz.123
    <Report Time> = 08:22:14:10:22AM
    <Interaction Time> = 08:23:15:09:55PM
    <Location> = latitude xy longitude zz
    <Cost> = moderate
    <Review> = 4/5
    <Misc> = Mission accomplished
```

Reporting nodes 24 and resource nodes 26 may exist in any event space, e.g., computing systems, network systems, social media systems, sensor systems, business and advertising systems, health care systems, research, manufacturing systems, etc. Reporting nodes 24 and resource nodes 26 may be part of a directed graph or any other graph structure.

As noted above, in many applications, it is impossible for data aggregation system 10 to guarantee the credibility of a given EM record 20. For example, data aggregation system 10 may utilize web crawlers, a social media platform, cloud computing, blind reporting, web interfaces, smartphone apps, etc., to collect EM records 20 with little or no verification as to the source or reliability (i.e., credibility) of the EM records 20. Thus, EM records 20 may be illegitimately created and reported to intentionally attack/corrupt the data in database 14, be mistakenly reported, include unintentional errors, etc. For instance, a reporting node (N1) may comprise a device or process that utilized a cloud resource (N2) to perform a system requirement (e.g., allocate memory on a virtual drive). Once complete, the reporting node N1 may inadvertently or intentionally report that the cloud resource N2 failed to achieve a desired objective, even though the requirement was successfully implemented.

To address such issues, a credibility vouching system (CVS) 12 is utilized to help vouch for the credibility of EM records 20 being reported to the data aggregation system 10. CVS 12 may be integrated into data aggregation system 10 (not shown) or be implemented separately (as shown), the latter allowing CVS 12 to service one or more data aggregation systems 10. Regardless of the implementation, a CVS interface 18 is incorporated into the data aggregation system 10, which allows the data aggregation system 10 to communicate and interact with CVS 12.

CVS 12 relies on one or more third party service providers 30 for information to assist in evaluating the credibility of a reported EM record 20. Third party service providers 30 may for example comprise: entities that manage transactions such as financial or computing transactions including credit card companies and crypto-currency exchanges; wireless providers that provide temporal and location based services that track time and location information, such as global positioning system (GPS) devices found in automobiles, smart phones and other smart appliances; social media applications that store behavioral data; healthcare providers that track patient data; an internet service provider; an insurance provider, etc.

The process operates generally as follows. When an EM record 20 is entered into the data aggregation system 10, the EM record 20 is forwarded to CVS 12. Once received, CVS 12 communicates with one or more third party service providers 30 to identify a set of candidate nodes representing probable consumers of the resource node 26 that may be responsible for reporting the associated EM record 20. Identification of the probable consumers may for example be based on one or more of spatial information, temporal information, transactional information, etc., provided by the third party service providers 30. For example, if interaction 22 took place at a particular time and location, and incurred some financial cost, a set of candidate nodes that generated EM record 20a can be identified based on information stored by GPS and financial transaction service providers 30. In particular, information from an EM record 20 can be matched to information stored by third party service providers 30.

As described herein, the specific identity of the candidate nodes need not be revealed to CVS 12 to ensure privacy. Instead, CVS 12 tasks one or more of the relevant third party service providers 30 to send a vouching request 32 to the set of candidate nodes, in this case nodes N2 and N3. Candidate nodes may be communicated with in any manner, e.g., via a network address, an email address, an internet protocol address, a user account name, and a phone number, etc. Vouching request 32 queries each candidate node N2, N3 to provide some type of response 34, 35 to vouch for the EM record 20. Responses 34, 35 may be automatically generated from a candidate node, or require user intervention such as a click on a hypertext link in an email message, etc. Responses 34, 35 from the candidate nodes N2, N3 are made available to CVS 12 to help verify the EM record 20a. For example, node N2 is shown receiving a vouching request 32 relating to EM record 20a, and returning a response 34 to CVS 12. If response 34 confirms that node N2 reported EM record 20a, CVS 12 can in turn confirm the credibility of EM record 20a.

A credibility score (e.g., number, ranking, yes/no, etc.) can then be returned to data aggregation system 10 and made available to data consumers 28 so that data consumers 28 can be more or less confident about EM record 20a. In this case, vouching request 32 may also be sent to node N3, which was not responsible for generating EM record 20a. Nonetheless, node N3 can still provide a response 35 to CVS 12 indicating that while it did not create EM record 20a, it can vouch for the credibility of EM record 20a, e.g., node N3 was a witness to the interaction 22, experienced a similar event with node N1 in the same timeframe, had a different experience, cannot vouch either way, etc.

Figure 2:
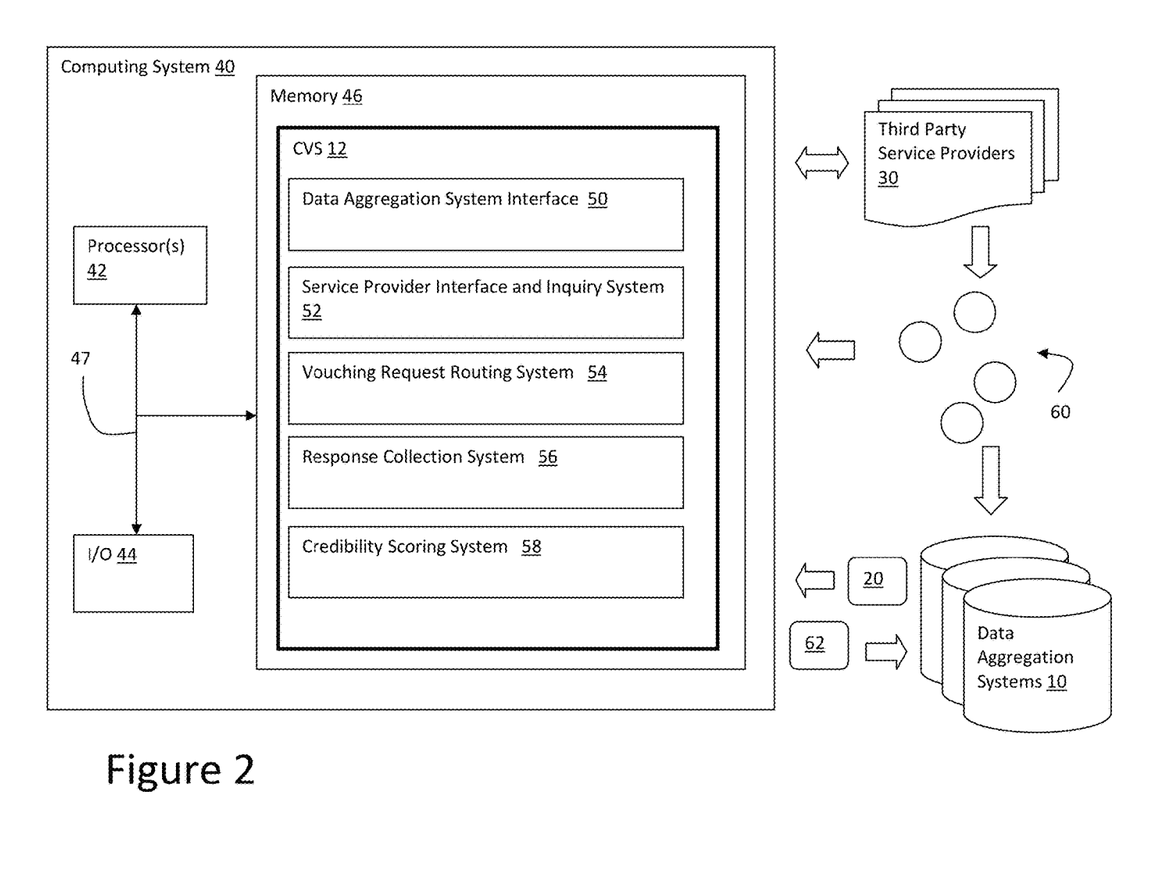
FIG. 2 shows a computer system for implementing a CVS.

FIG. 2 depicts an illustrative computing system 40 for implementing CVS 12. CVS 12 generally includes: a data aggregation system interface 50 that provides a communication pathway to receive EM records 20 from participating data aggregation systems 10 and for returning associated credibility scores 62; a service provider interface and inquiry system 52 that provides a communication pathway with third party service providers 30 to, e.g., identify candidate nodes 60 that potentially submitted EM records 20 to a participating data aggregation system 10; a vouching request routing system 54 for causing third party service providers 30 to send vouching requests to candidate nodes 60; a response collection system 56 for collecting responses from candidate nodes 60; and a credibility scoring system 58 that generates a credibility score 62 for each EM record 20 based on the collected responses.

As noted, service provider interface and inquiry system 52 utilizes third party service providers 30 to identify candidate nodes 60 that potentially submitted EM records 20 to a participating data aggregation system 10. To achieve this, a received EM record 20 is first analyzed to gather relevant data that might help to identify candidate nodes, e.g., the EM record 20 may contain the identity of the resource node, a date/time of the report, a date/time of the interaction with the resource node, a location of the interaction, a cost associated with the interaction, etc. Depending on what was reported, some of the data may be available, e.g., time of the report, while some may not, e.g., time of the interaction. Once all available relevant data is gathered, third party service providers 30 are engaged to help identify candidate nodes 60. In one illustrative approach, the relevant data is passed to a first provider 30, e.g., a financial institution, to identify a set of candidate nodes that could possibly have submitted the associated EM record 20 based on financial transactions that occurred during the same period. The results could then be passed to a second provider 30, e.g., a wireless company, to further pare down the set based on GPS and temporal data, etc.

In another illustrative embodiment, data from multiple service providers 30 could be aggregated and then clustered around a data vector extracted from the EM record 20, e.g., the cluster could contain nodes that engaged in a financial transaction of a particular range around a given date at near a given location. Nodes that are members of a defined cluster, i.e., ones that engaged in financial transactions, meet spatial and temporal parameters, etc., would be identified as candidate nodes 60.

Vouching requests generated by vouching request routing system 54 may be accomplished in any manner, e.g., they may be encapsulated in agents that traverse a graph to locate candidate nodes 60, comprise email messages, SMS messages, be delivered via internet protocol (IP) addressing, etc. Once delivered, candidate nodes 60 may generate automated responses, or involve manual responses. For instance, an agent may be configured to automatically interrogate a candidate node 60 and generate a response, e.g., by reviewing a log file to determine if an interaction with a resource node occurred and reporting the findings. Conversely, the vouching request may comprise an email message sent to a person, who can click a link and respond manually. Regardless, response collection system 56 collects the responses for analysis by credibility scoring system 58.

Any scoring algorithm may be utilized to score an EM record 20 within credibility scoring system 58. In a simple case, an EM record 20 may receive a "credible" or "not credible" score based on whether a candidate node 60 confirmed or could not confirm the sending of an associated EM record 20. In a more involved approach an EM record 20 may be scored on a scale (e.g., 1-5) based on an analysis of responses from one or more candidate nodes 60. In the event multiple responses were received regarding a single EM record 20, a voting or weighted averaging algorithm could be implemented to arrive at a final score.

As noted, CVS 12 may be utilized in any event space in which a data aggregation system receives EM records from reporting nodes. For example, CVS could be implemented in a smart appliance network in which appliances report interactions with repair technicians or agents. In such a case, each report (i.e., EM record 20) may indicate whether a problem was adequately addressed, when it was done, how much it cost, etc.

In a further illustrative example, CVS 12 may be utilized with a rating or review website such as yelp.com, tripadvisor.com, urbanspoon.com, etc. Although described herein as a restaurant review site, it could be used for any review site. Typically, a reviewer posts a review for a restaurant, which consists of rating(s) (e.g., 1 to 5 stars) and/or written comments. Other site users may vote a review (e.g., useful, funny, cool) and/or post follow-up comments. The total number of reviews and the overall rating are then aggregated for the restaurant. While many of these reviews may be honest and factual based on actual experiences, some of these reviews may be biased or even "fraudulent and tend to be more extreme (favorable or unfavorable) than other reviews." As there is no easy or direct way to identify the fake ones from the genuine ones, the credibility of reviews is fundamentally undermined.

Also, many, if not most, diners do not post reviews about their experiences, and thus many restaurants may receive only a limited number of reviews (relative to the actual number of diners). Therefore, even a few extreme ratings may significantly skew the overall rating for a restaurant. As a result, some users may not trust the ratings and comments at their face value. Some users may choose to spend time in analyzing various review ratings and comments and try to filter out the fake ones from genuine ones. Other users may even choose to ignore reviews all together.

In the present approach, a reviewer first posts a restaurant review to a rating and review site (i.e., data aggregation system). The rating and review site then automatically forwards the review information (e.g., reviewer profile, restaurant profile, review entry ID, review post date and time, visit date and time) to CVS 12. CVS 12 then creates a vouching request with information such as review information, restaurant's profile with GPS info, search date/time ranges, etc.

CVS then "inquires" the number of probable actual diners by sending the vouching request to the credit card companies and/or the wireless providers. The credit card companies use the restaurant's profile and date/time ranges to search for probable actual diners (i.e., candidate nodes 60), based on credit card transactions with the restaurant. The wireless providers uses the restaurant's GPS information and date/time ranges to further search for probable actual diners, based on the spatial-temporal information of mobile devices and dwell time.

Depending on if the returned population number(s) meet a pre-defined threshold, CVS 12 then "tasks" the credit card companies and/or wireless providers to forward the vouching requests (e.g., CVS links) to those probable actual diners. A CVS link may include a web link created by CVS 12 where identified probable actual diners can use to view and vouch/vote on the submitted review. (If necessary, CVS 12 could specify maximum of recipients in its request, and/or adjust the search date/time ranges in order to a have a larger/smaller population.)

The identified probable actual diners could use the CVS links to provide vouching responses, which would be captured on CVS 12. A credibility score is then calculated and updated in CVS 12 for the target review. The formula/algorithm for calculating the credibility score could be up to the implementers and/or rating and review sites. A default formula may be based on the number of "yes" votes and the number of respondents. The credibility score would then be available for consideration along with the target review on the rating and review site.

There are several advantages of using CVS 12 of using only known solutions mentioned above. Firstly, truly qualified reviewers for restaurants in review—probable actual diners—are identified and engaged, instead of relying only on rating and review site users. Secondly, these qualified reviewers are engaged to easily vouch the credibility of ratings and reviews post by others, even though they may not be site users and/or may not want to write reviews themselves. Thirdly, newly generated credibility scores, along with the ratings and reviews themselves, would be available to restaurant finders for credibility consideration. Fourthly, these qualified reviewers remain anonymous to CVS 12 and rating and review sites during the vouching process. CVS 12 does not need to acquire or store credit card transactions or GPS history (spatial-temporal info) of mobile devices or user information.

Figure 3:
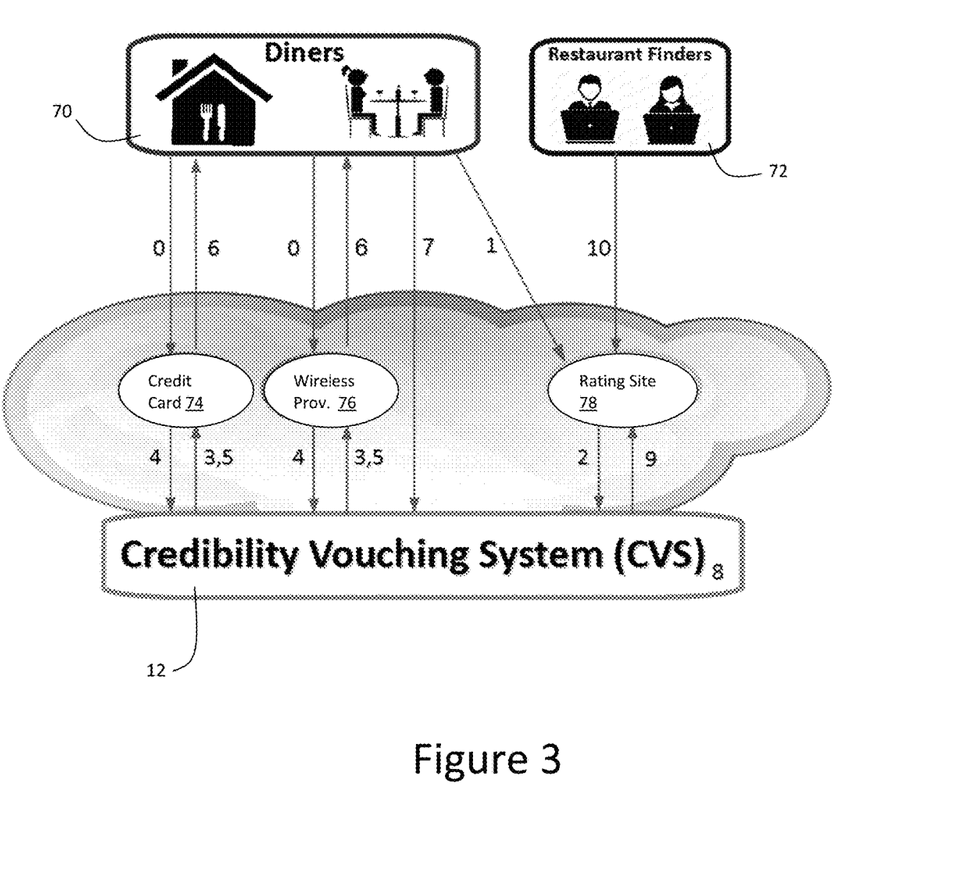
FIG. 3 shows a diagram of a CVS process involving a restaurant rating website.

FIG. 3 depicts a generalized figure showing the process. As it is a customary requirement for conducting business, all parties or companies described below are assumed to have opted into participating in this process.

(0) Spatial-temporal information of mobile devices are routinely and continuously collected and stored by wireless providers 76 which include location, time, device unique IDs, etc. Credit card transactions, on the other hand, are routinely stored by credit card providers 74 and include merchant information (e.g., name, address), transaction information (e.g., payer, amount, date, time, etc).

(1) A reviewer 70 posts a review for a restaurant to a rating and review site 78 with information such as: rating(s), review comment, visit date and time, etc.

(2) The rating and review site 78 then (automatically) forwards the review information (including reviewer profile, restaurant profile, review entry ID, review post date and time, visit date and time, etc.) to CVS 12.

(3) CVS 12 then creates a vouching request with information such as review information, restaurant's profile with GPS info, search date/time ranges, etc. CVS 12 would then "inquire" the number of probable actual diners by sending the vouching request to the credit card companies and/or the wireless providers.

(4) CVS 12 receives the number of probable actual diners from credit card 74 and/or wireless providers 76 that match the inquiry criteria. (In one embodiment, no identifiable/personal information about these diners is provided to CVS 12.) The credit card providers 74 would use the restaurant's profile and date/time ranges to search for probable actual diners, based on credit card transactions with the restaurant. The wireless providers 76 would use the restaurant's GPS information and date/time ranges to search for probable actual diners, based on the spatial-temporal information of mobile devices, dwell time, etc.

(5) If the returned population number(s) meet the predefined threshold, CVS 12 "tasks" the credit card providers 74 and/or wireless providers 76 to send/forward the vouching requests (e.g., CVS links) to those identified probable actual diners. A CVS link is a web link created by CVS 12 that identified probable actual diners can use to view and vouch/vote on the submitted review. (If necessary, CVS 12 could specify a maximum of recipients in its request, and/or adjust the search date/time ranges in order to a have a larger/smaller population.)

(6) Credit card providers 74 and wireless providers 76 forward/send the vouching requests (CVS links), on behalf of CVS 12, to the identified probable actual diners.

(7) The identified probable actual diners can use the CVS links to provide vouching responses, which would be captured by CVS 12.

(8) Based on the vouching responses, CVS 12 calculates and updates the credibility score for the target review. The formula/algorithm for calculating the credibility score could be up to the implementers and/or rating and review sites. A default formula could be based on the number of "yes" votes and the number of respondents. CVS 12 could also use the raw response data for further analysis.

(9) CVS 12 then forwards the credibility score for the target review to the rating and review site 78.

(10) Restaurant finders 72 can view and consider credibility scores along with the associated reviews on the rating and review site.

Figure 4:
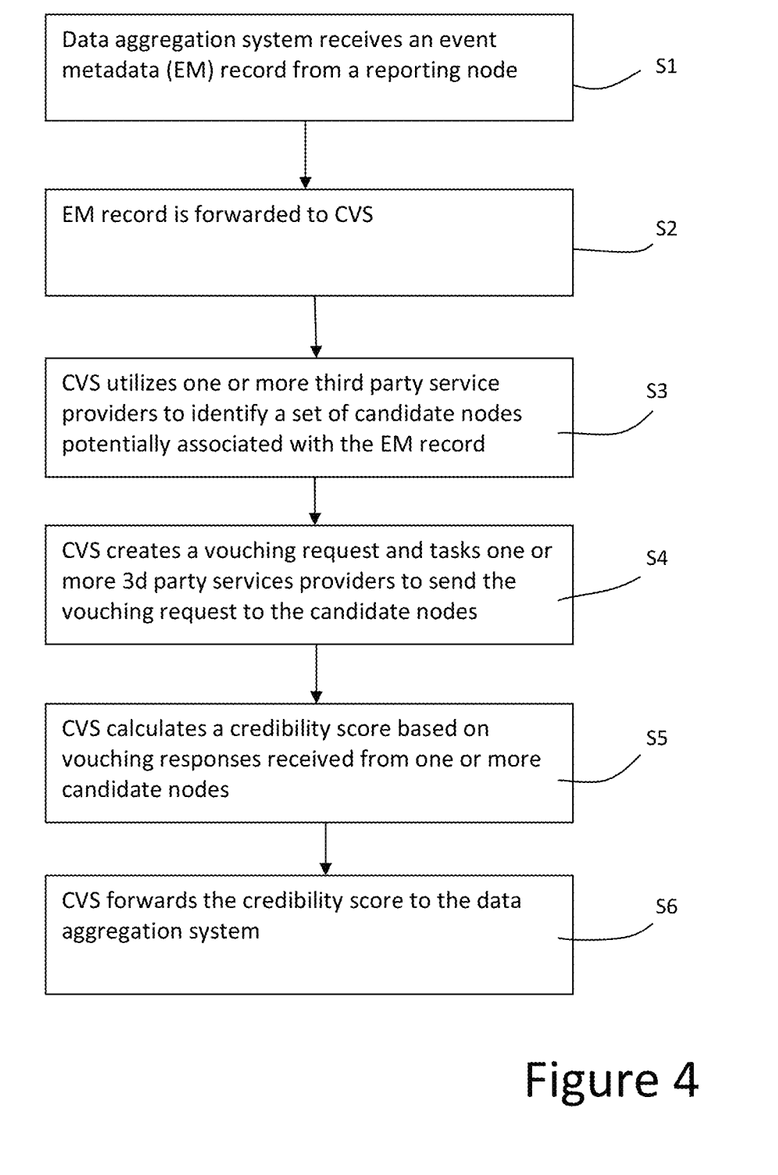
FIG. 4 shows a flow diagram of a CVS process.

FIG. 4 depicts a flow diagram describing a process of implementing CVS 12 with reference to FIGS. 1 and 2. At S1, a data aggregation system 10 receives and EM record 20 from a reporting node and at S2, the EM record 20 is forwarded to CVS 12. At S3, CVS 12 utilizes one or more third party service providers 30 to identify a set of candidate nodes potentially associated with the EM record 20. At S4, CVS creates a vouching request and tasks one or more third party service providers 30 to forward the vouching request to the candidate nodes. At S5, CVS 12 calculates a credibility score based on vouching responses received (or not received) from one or more candidate nodes. Finally, at S5, the credibility score is forwarded to the data aggregation system 10.

It is understood that the CVS 12 can be implemented as a single, self-contained apparatus, a distributed set of on-premise subsystems, as a cloud-based system or a hybrid of on-premise and cloud. In one embodiment, the CVS 12 is a cloud-based system for which stakeholders of interest subscribe to a vouching service.

Furthermore, the present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable, programmable, read-only memory (EPROM or Flash memory), a static random access memory (SRAM), a portable compact disc read-only memory (CD-ROM), a digital versatile disc (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, such as the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely or partly on a computer, device and/or apparatus, as a stand-alone software package, partly on a computer and partly on a remote computer or entirely on the remote computer or server. In the latter scenario, the remote computer may be connected to the user's computer through any type of network, including a local area network (LAN), a wide area network (WAN), geo-fence, Broadband wireless, near field wireless, personal area network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 2 depicts an illustrative computing system 40 that may comprise any type of computing device and, for example, includes at least one processor, memory, an input/output (I/O) 44 (e.g., one or more I/O interfaces and/or devices), and a communications pathway 47. In general, processor(s) 42 execute program code, such as CVS 12, which is at least partially fixed in memory 46. While executing program code, processor(s) 42 can process data, which can result in reading and/or writing transformed data from/to memory and/or I/O 44 for further processing. The pathway 47 provides a communications link between each of the components in computing system 40. I/O 44 can comprise one or more human I/O devices, which enable a user to interact with computing system 40. To this extent, CVS 12 can manage a set of interfaces (e.g., graphical user interfaces, application program interfaces, etc.) that enable humans and/or other systems to interact with CVS 12. Further, CVS 12 can manage (e.g., store, retrieve, create, manipulate, organize, present, etc.) data using any solution.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A credibility vouching system (CVS), comprising:
a processor and a memory;
a data aggregation system interface that provides a first communication pathway for receiving event metadata (EM) records from a data aggregation system;
a service provider interface and inquiry system that provides a second communication pathway with a plurality of third party service providers to facilitate identification of a set of candidate nodes potentially responsible for a submitted EM record in the data aggregation system;
a vouching request routing system for generating a vouching request and tasking at least one of the plurality of third party service providers to forward the vouching request to each node in the set of candidate nodes; and
a credibility scoring system that generates a credibility score for the submitted EM record based on a set of vouching responses received from the set of candidate nodes.

2. The CVS of claim 1, wherein each EM record comprises at least one of a review and a rating generated in response to an interaction with a resource node.

3. The CVS of claim 2, wherein the resource node comprises a service provider selected from a group consisting of: a restaurant, a hotel, and a business.

4. The CVS of claim 1, wherein the plurality of third party service providers include at least one of: a financial transaction service provider, a credit card provider, a wireless company, a health care company, an internet service provider, a social media company, and an insurance provider.

5. The CVS of claim 1, wherein the set of candidate nodes are determined based on financial data, spatial data, and temporal data stored by the plurality of third party service providers.

6. The CVS of claim 1, wherein the vouching request is contained in at least one of: an email, a text message, and an agent, and wherein the vouching request includes a hypertext link for generating a vouching response.

7. The CVS of claim 6, wherein the set of candidate nodes are communicated with via at least one of: an email address, an internet protocol address, a user account name, and a phone number.

8. A computerized method for vouching credibility of event metadata (EM) records inputted to a data aggregation system, comprising:
   receiving an EM record from the data aggregation system;
   communicating with a plurality of third party service providers to facilitate identification of a set of candidate nodes potentially responsible for the EM record;
   generating a vouching request and tasking at least one of the plurality of third party service provider to forward the vouching request to each node in the set of candidate nodes; and
   generating a credibility score for the submitted EM record based on a set of vouching responses received from the set of candidate nodes.

9. The computerized method of claim 8, wherein the EM record comprises at least one of a review and a rating generated in response to an interaction with a resource node.

10. The computerized method of claim 9, wherein the resource node comprises a service provider selected from a group consisting of: a restaurant, a hotel, and a business.

11. The computerized method of claim 8, wherein the plurality of third party service providers include at least one of: a financial transaction service provider, a credit card provider, a wireless provider, a health care provider, an internet service provider, a social media company, and an insurance provider.

12. The computerized method of claim 8, wherein the set of candidate nodes are determined based on financial data, spatial data, and temporal data stored by the plurality of third party service providers.

13. The computerized method of claim 12, wherein the vouching request is contained in at least one of: an email, a text message, and an agent, and wherein the vouching request includes a hypertext link for generating a vouching response.

14. The computerized method of claim 13, wherein the candidate nodes are communicated with via at least one of: an email address, an internet protocol address, a user account name, and a phone number.

15. A program product stored on a computer readable storage medium, which when executed by a computer system, provides a credibility score for event metadata submitted to data aggregation system, comprising:
   program code for receiving an EM record from the data aggregation system;
   program code for communicating with a plurality of third party service providers to facilitate identification of a set of candidate nodes potentially responsible for the EM record;
   generating a vouching request and tasking at least one of the plurality of third party service provider to forward the vouching request to each node in the set of candidate nodes; and
   generating a credibility score for the submitted EM record based on a set of vouching responses received from the set of candidate nodes.

16. The program product of claim 15, wherein the submitted EM record comprises at least one of a review and a rating generated in response to an interaction with a resource node.

17. The program product of claim 16, wherein the resource node comprises a service provider selected from a group consisting of: a restaurant, a hotel, and a business.

18. The program product of claim 15, wherein the plurality of third party service providers include at least one of: a financial transaction service provider, a credit card provider, a wireless provider, a health care provider, an internet service provider, a social media company, and an insurance provider.

19. The program product of claim 15, wherein the set of candidate nodes are determined based on financial data, spatial data, and temporal data stored by the plurality of third party service providers.

20. The program product of claim 15:
   wherein the vouching request is contained in at least one of: an email, a text message, and an agent, and wherein the vouching request includes a hypertext link for generating a vouching response; and
   wherein the set of candidate nodes are communicated with via at least one of: an email address, an internet protocol address, a user account name, and a phone number.

* * * * *